(12) United States Patent
Sandstrom et al.

(10) Patent No.: US 6,220,323 B1
(45) Date of Patent: *Apr. 24, 2001

(54) COMPOSITION AND TIRE WITH TREAD CONTAINING CALCIUM CARBONATE

(75) Inventors: Paul Harry Sandstrom, Tallmadge; Mark Samuel Sinsky, Akron, both of OH (US)

(73) Assignee: The Goodyear Tire & Rubber Company, Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,143

(22) Filed: Jan. 29, 1998

(51) Int. Cl.$^7$ ...................................................... B60C 11/00
(52) U.S. Cl. ........................ 152/209.5; 152/905; 524/99; 524/262; 524/426
(58) Field of Search ............................. 524/99, 262, 303, 524/304, 426; 152/209 R, 209.5, 905

(56) References Cited

U.S. PATENT DOCUMENTS

| | | | |
|---|---|---|---|
| 3,873,489 | * 3/1975 | Thurn et al. ........................ | 524/262 |
| 4,341,672 | * 7/1982 | Hsien ................................ | 152/209.5 |
| 4,517,336 | * 5/1985 | Wolff et al. ......................... | 524/262 |
| 5,066,702 | * 11/1991 | Hayashi et al. ..................... | 524/426 |
| 5,336,730 | * 8/1994 | Sandstom et al. ................. | 525/332.6 |
| 5,396,940 | * 3/1995 | Segatta et al. ..................... | 152/209 R |
| 5,447,976 | * 9/1995 | Curtin et al. ........................ | 525/438 |
| 5,504,137 | * 4/1996 | Sandstom et al. ................. | 524/99 |
| 5,896,904 | 4/1999 | Osaki et al. ......................... | 524/495 |

FOREIGN PATENT DOCUMENTS

| | | | |
|---|---|---|---|
| 19739475A | 3/1998 | (DE) ................................ | B60C/1/00 |
| 09150606A | 6/1997 | (JP) ................................ | B60C/11/00 |

OTHER PUBLICATIONS

The Vanderbilt Handbook–ed. George G. Winspear, p. 248, 1968.*

* cited by examiner

*Primary Examiner*—Veronica P. Hoke
(74) *Attorney, Agent, or Firm*—Henry C Young, Jr.

(57) ABSTRACT

The invention relates to a rubber composition containing relatively low levels of carbon black and/or silica reinforcement together with a particulate calcium carbonate and selected modifiers. The invention particularly relates to a tire having a component, particularly a tread, of such composition.

1 Claim, No Drawings

COMPOSITION AND TIRE WITH TREAD CONTAINING CALCIUM CARBONATE

FIELD

The invention relates to a rubber composition containing relatively low levels of carbon black and/or silica reinforcement together with a particulate calcium carbonate and selected modifier(s). The invention particularly relates to a tire with a component thereof, particularly a tire tread.

BACKGROUND

Rubber compositions are typically used for tire treads which may be optimized for various rubber composition properties to promote one or more of three tire properties; namely, traction, rolling resistance and treadwear.

In this regard, typically desirable physical properties for tire tread rubber compositions may include, for example, hysteresis, hardness and modulus. Some properties are normally indicated by their rebound properties, tangent delta (Tan. delta) at 0° C., and abrasion resistance. Hysteresis is conventionally related to Hot Rebound values. Such physical properties are well known to those having skill in the rubber compounding art and, in general, are considered to be somewhat predictive of tire tread performance.

More specifically, it is sometimes desired that a tire have a relatively low rolling resistance to enhance a vehicle's fuel economy. A lower hysteresis, usually evidenced by a higher hot rebound value, of a cured, or vulcanized, rubber composition is predictive of reduced heat build-up for the rubber composition and, therefore, of its utility for a relatively low rolling rubber composition for use as a tire tread.

It is often an accepted practice to reduce particulate reinforcement of a rubber composition to a relatively low level to reduce its hysteresis and thus, a predictive reduction in rolling resistance for a tire tread application. For example, where it might be desired to reduce a tire's rolling resistance by reducing hysteresis increasing hot rebound values of a rubber composition for a tire tread application, particulate reinforcement such as carbon black and/or silica might conventionally be reduced from a somewhat normal range of about 55 to about 80 phr to a reduced amount of such reinforcement in a range of about 30 to about 50, and particularly about 30 to about 45, phr. Such reduction in particulate reinforcement for a tire tread rubber for reduction in a tire's rolling resistance is well known to those having skill in such art.

However, commensurate with rolling resistance of the tire tread composition reduction by reducing reinforcing filler content, with other aspects of the rubber composition being essentially unchanged, the tire tread wear resistance often decreases, as may be evidenced by an increase in the tire's treadwear, and there is usually a degree of loss in tire tread traction. In one aspect, a tire's increase in treadwear can sometimes be predicted or somewhat correlated, reduction in the cured rubber composition's abrasion resistance.

Accordingly, it is desired herein to provide a tire tread rubber composition with reduced hysteresis (increased hot rebound values) while substantially maintaining an acceptable abrasion resistance, and usually an acceptable tire tread traction.

It is desired to provide such rubber composition with low levels of carbon black and/or silica reinforcement.

It is recognized herein that calcium carbonate has sometimes been used as a relatively low cost filler and extender for various polyolefin resins and some elastomers. However, it is believed herein that it has not been used in tire treads with a relatively low carbon black content together with specified modifier(s).

In the description of this invention, the term "phr," where used herein, and according to conventional practice, refers to "parts of a respective material per 100 parts by weight of rubber or elastomer".

In the description of this invention, the terms "rubber" and "elastomer," if used herein, may be used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art.

SUMMARY AND DESCRIPTION OF THE INVENTION

In accordance with this invention, a rubber composition is provided, and particularly a tire with a component of such composition, including a tire tread, which comprises (A) 100 parts by weight of elastomer consisting essentially of (1) at least one diene-based elastomer, or (2) a combination of diene-based elastomer and an epoxidized diene-based elastomer, preferably as a cis 1,4-polyisoprene natural rubber, (B) about 15 to about 45, alternatively about 25 to about 40, phr of particulate reinforcement selected from carbon black and/or precipitated silica, said silica having silanol groups on the surface thereof, (C) about 5 to about 50, alternatively about 10 to about 30, phr of particulate calcium carbonate and (D) at least one modifier comprised of at least one of dithiodipropionic acid, nicotinamide and bis-3(trialkoxysilylalkyl) polysulfide having an average of from 2.1 to about 4 sulfur atoms in its polysulfide bridge and where such alkyl groups contain from two to four carbon atoms.

In one aspect of the invention, wherein said elastomers are about (a) 5 to about 30 phr of epoxidized diene-based rubber, preferably epoxidized natural cis 1,4-polyisoprene rubber, containing about 20 to about 50 percent epoxidization and (b) about 95 to about 70 phr of said diene based rubber.

In one aspect, the said particulate reinforcement for the rubber composition may be composed of about 15 to about 30 phr of such carbon black without precipitated silica or about 13 to about 35 phr of precipitated silica and about 2 to about 20 phr of carbon black.

For the purposes of this invention, a significant aspect is the relatively low concentration of carbon black reinforcement in combination with the use of calcium carbonate and modifiers).

The modifier may be dithiodipropionic acid.

The modifier may be nicotinamide.

The modifier may be a bis-3(trialkoxysilylalkyl) polysulfide having from 2 to about 8, with an average of about 2.1 to about 4, sulfur atoms in its polysulfidic bridge. Usually an average of from 2.1 to about 2.5 or from about 3.2 to about 4 sulfur atoms are preferred for the polysulfidic bridge. Usually the trialkoxy groups are selected from trimethoxy and triethoxy groups and the remaining alkyl groups are selected from ethyl, propyl and butyl groups. Thus, such modifier might, for example, be selected from bis-1 (trimethoxysilylpropyl) polysulfide and bis-3 (triethoxysilylpropyl) polysulfide.

While it is recognized that such modifiers might also sometimes be known as silica couplers having a moiety reactive with silanol groups contained on the surface of the silica and another moiety, usually a polysulfide, interactive with one or more of said diene-based elastomers, in this case it appears that they serve to interact with the calcium carbonates.

Usually the modifier is present as a weight ratio of modifier to calcium carbonate in a range of about 1/100 to about 1/1, alternatively in a range of about 1/50 to about 1/5 or in a more limited range of about 1/20 to about 1/10.

Other forms of silica, including fumed silica which is different from precipitated silica, are not preferred.

Usually the calcium carbonate has a particle size average diameter in a range of about 50 to about 14,000 nanometers (nm).

In practice, the surface of the particulate calcium carbonate can be coated, if desired, to aid in its dispersion in a rubber composition. Such coating may be, for example, in a form of a polyolefinic material, particularly a saturated polyolefinic material.

FURTHER DETAILED DESCRIPTION

It is considered that this invention is particularly applicable where it is desired to endeavor to minimize tire tread rolling resistance and, namely to provide higher hot rebound values for a tire tread elastomer composition, but where it is also desired to substantially retain rubber composition physical properties such as, for example, DIN abrasion which may relate to treadwear, stiffness, tensile strength and modulus and/or tread traction.

In the practice of this invention, it is believed to be a very substantial departure from past practice for rubber tire treads to utilize relatively low levels of reinforcing pigments such as carbon black and/or silica and to correspondingly use calcium carbonate as a relatively non-reinforcing filler, together with modifier(s), to increase the overall filler level to a range of about 30 to about 65 phr for the total amount of the carbon black and/or silica, as the case may be, and calcium carbonate, with the amount of carbon black and optional silica being restricted to a maximum of about 45 phr.

The carbon blacks used may be conventional rubber reinforcing carbon blacks. Such carbon blacks may, for example have a DBP (dibutylphthalate) adsorption value in a range of about 70 to about 150, usually about 80 to about 130, cc/100 gm and a corresponding Iodine adsorption value in a range of about 40 to about 140, usually about 60 to about 125, g/kg. Representative of various carbon blacks, for example, that fall within the above ranges include, for example, N121, N220, N234. The aforesaid N121 and N220 carbon blacks reportedly have a DBP value of about 130 and 114, respectively, and an Iodine adsorption value of about 120 and 121, respectively. If desired, a combination of high reinforcing and relatively low reinforcing carbon blacks might be used such as, for example, a combination of N110 and/or N220 high reinforcing carbon black with N550 and/or N660 relatively low reinforcing carbon black wherein about 60 to about 80 weight percent of the carbon black is the high reinforcing carbon black.

It is one important aspect of this invention that the addition of the calcium carbonate filler, and associated modifier(s), might be used exclusive of, or in the absence of silica or possibility only a relatively small amount of silica such as, for example about 10 to about 15 or 20 phr of silica to endeavor to achieve a reduction of rebound values for a rubber composition intended for use as a tire tread (prediction of less rolling resistance), while still maintaining a satisfactory DIN abrasion value for the cured rubber composition, as compared to using relatively low levels of carbon black alone for the rubber reinforcement.

While it has been contemplated that addition of substantial and, therefore, quantitative amounts of precipitated silica, together with a silica coupler, as compared to use of a carbon black reinforcement, to a rubber composition may enhance, or promote, an increase in rebound values and, therefore, hysteresis which is predictive of a reduction in rolling resistance for a tire tread, the significance of this invention is that, for many rubber compositions contemplated for use as a tire tread, the quantitative use of silica reinforcement may not be necessary where relatively low tire tread rolling resistance is a significant consideration for the tire tread.

This is accomplished by replacing at least a portion of the silica with calcium carbonate but requiring one of more of said modifiers to also be present.

Thus a reduced amount of silica content in the tread rubber composition might be used and still achieve the rubber composition's rebound and DIN abrasion values.

A significance of this discovery, at least in one sense, is even greater when taking into consideration that (i) the silica is considerably more expensive than the carbon black and calcium carbonate and, further, that (ii) considerably more mixing, and thus greater rubber processing, time is normally required when using relatively high concentrations of silica reinforcement for the tire tread rubber composition.

Thus, it is contemplated for this invention that use of the calcium carbonate, together with the modifier(s) may enhance the rubber composition processing, namely by reducing the mixing timer, as compared to a rubber composition containing using a silica concentration of 60 phr or greater.

It is understood that the DBP (dibutylphthalate) adsorption values may be determined by ASTM test D2414 and the Iodine values may be determined by ASTM test D1510.

For example, the Iodine value, or number, for carbon black is a measure of its surface area and is expressed in units of g/kg. A higher Iodine value is indicative of smaller particle size which, in turn, is indicative of higher surface area for the carbon black and typically a higher reinforcing carbon black for elastomers.

The DBP (dibutylphthalate) adsorption value for carbon black is a measure of its structure, or aggregate size and is higher DBP adsorption value indicative of larger aggregates which, in turn, is indicative of higher structure for the carbon black.

Iodine values and DBP values together with representative ASTM designated N-numbers may be found, for example, in *The Vanderbilt Rubber Handbook, Thirteenth Edition* (1990), page 417.

In the practice of this invention, as hereinbefore pointed out, the rubber composition is comprised of (i) at least one diene-based elastomer, or rubber or (ii) a combination of at least one diene-based elastomer with an epoxidized diene-based elastomer such as epoxidized natural rubber.

Such diene-based elastomers are typically selected from homopolymers and copolymers of conjugated dienes and copolymers of conjugated diene(s) and vinyl aromatic compound such as, for example, styrene and alpha-methylstyrene. Such dienes may, for example, be selected from isoprene and 1,3-butadiene and such vinyl aromatic compounds may be selected from styrene and alpha-methylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber (30–90 percent vinyl).

In one aspect, the rubber is often comprised of at least two diene-based elastomers in which one of the elastomers is cis 1,4-polybutadiene. Such combination of elastomers may also be used together with an epoxidized diene-based elastomer such as epoxidized natural rubber. For example, such combination of two or more diene-based rubbers may be cis 1,4-polyisoprene rubber (natural or synthetic, although natural is usually preferred), 3,4-polyisoprene rubber, isoprene/butadiene copolymer rubber, styrene/isoprene/butadiene rubber, emulsion and solution polymerization derived styrene/butadiene rubbers, cis 1,4-polybutadiene rubbers, medium vinyl polybutadiene rubbers (30–55 percent vinyl), high vinyl polybutadiene rubbers (55–90 percent vinyl) and emulsion polymerization prepared butadiene/acrylonitrile copolymers.

The epoxidized natural rubber is known to those having a skill in the art and may be described as a modified form of natural cis 1,4-polyisoprene rubber in which some of its unsaturation is replaced by epoxidized groups.

Epoxidized natural rubber which may be used in this invention may have a level of epoxidized modification ranging from about 15 to about 85, preferably about 20 to about 50, mole percent.

A particularly preferred level epoxidized level for the natural rubber is about 25 mole percent. As is known to those having skill in such art, epoxidized natural rubber can be obtained by epoxidizing natural rubber latex. Such epoxidized natural rubber may be obtained from Malaysian rubber producers under a designation, for example, of ENR 25 (25 percent epoxidized level) and ENR 50 (50 percent epoxidized level).

In one aspect of this invention, an emulsion polymerization derived styrene/butadiene (E-SBR) might be used as a diene-based elastomer having a relatively conventional styrene content of about 20 to about 28 percent bound styrene or, for some applications, an E-SBR having a relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent.

In one aspect, the E-SBR may also contain acrylonitrile to form a terpolymer rubber in amounts, for example, of about 2 to about 30 weight percent bound acrylonitrile in the terpolymer.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90 percent cis 1,4-content.

The cis 1,4-polyisoprene and cis 1,4-polyisoprene natural rubber are well known to those having skill in the rubber art.

A styrene/isoprene/butadiene terpolymer elastomer (SIBR) may be used in rubber composition of this invention. Representative examples of various SIBR's may be found, for example, in U.S. Pat. Nos. 5,137,998, 5,159,020 and 5,272,220.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, coupling agent, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the additives mentioned above are selected and commonly used in conventional amounts.

The composition of the present invention may contain conventional amounts of known rubber chemicals.

Typical amounts of tackifier resins, if used, may comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of most of the above additives are not considered to be an aspect of the present invention which is more primarily directed to the utilization of relatively low levels of reinforcing pigments as carbon black and/or silica together with a particulate calcium carbonate filler in rubber compositions for tire treads.

The rubber composition may be prepared, for example, by thermomechanically working and mixing the diene-based rubber, epoxidized natural rubber if used, calcium carbonate, modifier(s), carbon black and/or silica and other rubber compounding ingredients, exclusive of the rubber curatives, in at least one sequential mixing step with at least one mechanical mixer, usually referred to as "non-productive" mix stage(s), to a temperature in a range of about 160° C. to about 190° for a sufficient duration of time, usually within about 4 to about 8 minutes, followed by a final mix stage in which the curatives, such as sulfur and accelerators, are added and mixed therewith for about 1 to about 4 minutes to a temperature within a range of about 90° C. to about 125° C. The terms "non-productive" and "productive" mix stages are well known to those having skill in the rubber mixing art.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (i) adjusting the motor speed of the mixer, namely reducing the motor speed after the desired temperature of the rubber composition is reached, in a variable speed mixer or by (ii) utilizing two or more mix stages sufficient to satisfy the duration requirement for the aforesaid maximum mixing temperature maintenance.

Vulcanization of the rubber composition of the present invention is generally carried out at conventional temperatures ranging from 100° C. to 200° C. Preferably, the vulcanization is conducted at temperatures ranging from 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tread for a pneumatic tire which is the subject of this invention. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

EXAMPLE I

Rubber compounds containing synthetic cis 1,4-polyisoprene rubber and reinforced with, variously, carbon black, silica and calcium carbonate were prepared in a three-stage Banbury mix (Table 1) and referenced herein as Exp. B, C and D. A control rubber composition was prepared as Ctrl A. Cure behavior and cured properties for these compounds are shown in Table 2. The gradual replacement of silica with 5, 10 and 15 phr calcium carbonate (Exps. B, C and D) illustrates a significant increase in rebound values and reduction of Tan.delta at 60° C. as compared to the control (Ctrl A) without significantly affecting cure behavior or other cured properties. The increase in rebound value and reduction of the Tan.delta (60° C.) is predictive of improved (reduced) rolling resistance when used as a tire tread rubber composition.

TABLE 1

|  | Ctrl A | Exp B | Exp C | Exp D |
| --- | --- | --- | --- | --- |
| 1st Non-Productive |  |  |  |  |
| NATSYN ® 2200[1] | 100 | 100 | 100 | 100 |
| Carbon black[2] | 35 | 35 | 35 | 35 |
| Antioxidant[3] | 2 | 2 | 2 | 2 |
| Processing oil[4] | 5 | 5 | 5 | 5 |
| Zinc oxide | 5 | 5 | 5 | 5 |
| Fatty acid[5] | 2 | 2 | 2 | 2 |
| 2nd Non-Productive |  |  |  |  |
| Silica[6] | 15 | 10 | 5 | 0 |
| Si69 Coupler (50%)[7] | 3 | 3 | 3 | 3 |
| Calcium carbonate[8] | 0 | 5 | 10 | 15 |
| Productive |  |  |  |  |
| Sulfenamide accelerator | 1.0 | 1.0 | 1.0 | 1.0 |
| Sulfur | 1.4 | 1.4 | 1.4 | 1.4 |

[1]Synthetic cis 1,4-polyisoprene from The Goodyear Tire & Rubber Company.
[2]General purpose tread reinforcing carbon black (GPT).
[3]Of the polymerized 1,2-dihydro-2,2,4-trimethylquinoline type.
[4]Napthenic/paraffinic.
[5]Primarily stearic acid also containing palmitic and oleic acid.
[6]Hi-Sil 210 from PPG Industries, Inc.
[7]X50S from Degussa, A. G. as a 50/50 ratio of bis(3-ethoxysilylpropyl) tetrasulfide and carbon black.
[8]Natural ground calcium carbonate obtained as Atomite from ECC America.

TABLE 2

| Properties | Ctrl A | Exp B | Exp C | Exp D |
| --- | --- | --- | --- | --- |
| Max torque (MPa) | 32 | 31.3 | 31.6 | 32 |
| Min torque (MPa) | 7.4 | 5.5 | 5.2 | 5.5 |
| $T_{90}$, min | 19.5 | 18.0 | 16.5 | 16.0 |
| $T_{25}$, min | 13.3 | 12.0 | 11.5 | 11.0 |
| Tensile strength, MPa | 20.2 | 19.5 | 19.6 | 19.1 |
| Elongation @ break, % | 613 | 593 | 589 | 573 |
| $M_{100}$, MPa | 1.59 | 1.59 | 1.57 | 1.54 |
| $M_{300}$, MPa | 7.76 | 7.73 | 7.61 | 7.33 |
| Rebound, RT[1] | 48.9 | 51.3 | 54.0 | 57.3 |
| Rebound, hot[2] | 61.5 | 63.7 | 66.6 | 69.3 |
| Hardness, RT[1] | 53.1 | 53.3 | 52.7 | 52.4 |
| Hardness, hot[2] | 52.2 | 52.0 | 51.2 | 51.3 |
| E' @ 60° C., MPa | 10.7 | 9.4 | 8.5 | 8.0 |
| Tan. Delta @ 60° C. | 0.089 | 0.089 | 0.080 | 0.064 |
| DIN Abrasion (cc loss) | 144 | 165 | 180 | 167 |

[1]Room temperature, or about 23° C.
[2]100° C.

EXAMPLE II

Rubber compounds containing emulsion polymerization prepared styrene/butadiene copolymer rubber (E-SBR), cis 1,4-polybutadiene rubber and synthetic cis 1,4-polyisoprene rubber and reinforced with carbon black and calcium carbonate were prepared in a three-stage Banbury mix (Table 3) and identified herein as Exs F–K. Cure behavior and cured properties for these compounds are shown in Table 4. Compounds F, G and H contain 40 phr carbon black and 40 phr calcium carbonate, whereas compounds I, J and K contain 30 phr carbon black and 50 phr calcium carbonate. Compounds G and J also contain 3 phr and 4 phr Si69 (50%) coupler, respectively, and compounds H and K also contain 2 phr and 2.5 phr dithiodipropionic acids, respectively. The cured properties of the calcium carbonate containing compounds are observed to have been improved by the addition of either Si69 or dithiodipropionic acid. The improvement is shown in tensile strength, 100% modulus, hot rebound, hardness and DIN abrasion (lower is better).

The mixing procedure was similar to Example I.

The recipe is depicted in the following Table 3.

The resulting physical properties after curing the rubber composition at about 36 minutes at about 150° C. are shown in Table 4.

TABLE 3

|  | Ex F | Ex G | Ex H | Ex I | Ex J | Ex K |
| --- | --- | --- | --- | --- | --- | --- |
| 1st Non-Productive |  |  |  |  |  |  |
| E-SBR[1] | 68.75 | 68.75 | 68.75 | 68.75 | 68.75 | 68.75 |
| BUDENE ® 1207[2] | 15.0 | 15.0 | 15.0 | 15.0 | 15.0 | 15.0 |
| NATSYN ® 2200 | 35.0 | 35.0 | 35.0 | 35.0 | 35.0 | 35.0 |
| Carbon black[3] | 40.0 | 40.0 | 40.0 | 30.0 | 30.0 | 30.0 |
| Calcium carbonate[4] | 20.0 | 20.0 | 20.0 | 30.0 | 30.0 | 30.0 |
| Antioxidant | 2 | 2 | 2 | 2 | 2 | 2 |
| Zinc oxide | 3 | 3 | 3 | 3 | 3 | 3 |
| Fatty acid | 3 | 3 | 3 | 3 | 3 | 3 |
| 2nd Non-Productive |  |  |  |  |  |  |
| Calcium carbonate[4] | 20.0 | 20.0 | 20.0 | 20.0 | 20.0 | 20.0 |
| Si69 Coupler (50%) | 0 | 3 | 0 | 0 | 4 | 0 |
| Dithiodipropionic acid | 0 | 0 | 2 | 0 | 0 | 2.5 |
| Productive |  |  |  |  |  |  |
| Sulfenamide accelerator | 3 | 3 | 3 | 3 | 3 | 3 |
| Diphenylguanidine | 2 | 2 | 2 | 2 | 2 | 2 |
| Sulfur | 3 | 3 | 3 | 3 | 3 | 3 |

[1]Emulsion polymerization prepared SBR from The Goodyear Tire & Rubber Company as PLF 1712; having a 23.5% styrene content; and containing 37.5 phr aromatic oil (50 phr rubber in compounds).
[2]High cis 1,4-polybutadiene rubber from The Goodyear Tire & Rubber Company.
[3]N330 type.
[4]Natural ground calcium carbonate obtained as Atomite from ECC America.

TABLE 4

| Compounds | F | G | H | I | J | K |
| --- | --- | --- | --- | --- | --- | --- |
| Carbon black | 40 | 40 | 40 | 30 | 30 | 30 |
| Calcium carbonate | 40 | 40 | 40 | 50 | 50 | 50 |
| Si69 (50%) | 0 | 3 | 0 | 0 | 4 | 0 |
| Dithiodipropionic acid | 0 | 0 | 2 | 0 | 0 | 2.5 |
| Max. torque | 46.0 | 53.0 | 45.0 | 44.0 | 46.4 | 52.3 |
| Min. torque | 4.0 | 5.0 | 5.1 | 4 | 4 | 11 |
| $T_{90}$, minute | 9.5 | 16.0 | 10.0 | 10.0 | 17.5 | 21.5 |
| $T_{25}$, minute | 5.5 | 8.5 | 5.5 | 5.5 | 9.0 | 15.8 |
| Tensile strength, MPa | 7.0 | 9.5 | 8.8 | 5.4 | 7.5 | 6.7 |
| Elongation @ break, % | 211 | 269 | 180 | 209 | 310 | 212 |
| $M_{100}$, MPa | 2.9 | 3.2 | 3.4 | 2.3 | 2.2 | 2.9 |
| Rebound, RT | 57.5 | 53.4 | 57.8 | 62.3 | 57.2 | 63.1 |
| Rebound, hot | 67.2 | 69.7 | 67.9 | 68.6 | 72.3 | 70.2 |
| Hardness, RT | 62.5 | 67.1 | 65.8 | 60.5 | 61.2 | 61.9 |
| Hardness, hot | 61.7 | 64.8 | 65.0 | 59.2 | 59.4 | 61.7 |
| DIN abrasion | 216 | 205 | 208 | 274 | 243 | 240 |

EXAMPLE III

Rubber compounds containing solution polymerization prepared styrene/butadiene rubber (S-SBR) and natural rubber and reinforced with carbon black and calcium carbonate were prepared in a three-stage Banbury mix (Table 5) and referenced herein as Exp L, M and N.

Cure behavior and cured properties for these compounds are shown in Table 6. The compounds (rubber compositions) were cured at about 150° C. for about 36 minutes. Compound L contains Si69 coupling agent, whereas Compound M also contains dithiodipropionic acid and Compound N also contains nicotinamide. Compounds M and N were observed to exhibit improved (increased) tensile strength at break and higher 300% modulus and hardness than Compound L.

TABLE 5

|  | L | M | N |
| --- | --- | --- | --- |
| 1st Non-Productive |  |  |  |
| S-SBR[1] | 50.0 | 50.0 | 50.0 |
| Natural rubber | 50.0 | 50.0 | 50.0 |
| Carbon black[2] | 43.0 | 43.0 | 43.0 |
| Antioxidant | 2.2 | 2.2 | 2.2 |
| Processing aids | 5.5 | 5.5 | 5.5 |
| Zinc oxide | 3.5 | 3.5 | 3.5 |
| Fatty acid | 2.0 | 2.0 | 2.0 |

TABLE 5-continued

|  | L | M | N |
|---|---|---|---|
| 2nd Non-Productive |  |  |  |
| Calcium carbonate[3] | 17.0 | 17.0 | 17.0 |
| Si69 Coupler (50%) | 3.5 | 3.5 | 3.5 |
| Dithiodipropionic acid | 0 | 2.0 | 0 |
| Nicotinamide | 0 | 0 | 2.0 |
| Productive |  |  |  |
| Sulfenamide accelerator | 1.0 | 1.0 | 1.0 |
| Antioxidant | 1.2 | 1.2 | 1.2 |
| Sulfur | 1.5 | 1.5 | 1.5 |
| Diphenylguanidine | 0.4 | 0.4 | 0.4 |

[1]Solution polymerization prepared styrene/butadiene copolymer rubber obtained as SLF 1216 from The Goodyear Tire & Rubber Company.
[2]N-330.
[3]Natural ground calcium carbonate, obtained as "Carnel-Wite" from Genstar company.

TABLE 6

| Compounds | L | M | N |
|---|---|---|---|
| Si69 | 3.5 | 3.5 | 3.5 |
| Dithiodipropionic acid | 0 | 2.0 | 0 |
| Nicotinamide | 0 | 0 | 2.0 |
| Max torque | 38.0 | 41.5 | 42.0 |
| Min torque | 5.0 | 5.0 | 5.5 |
| $T_{90}$, minutes | 14.5 | 23.5 | 17.0 |
| $T_{25}$, minutes | 6.5 | 7.3 | 4.3 |
| Tensile strength, MPa | 15.8 | 18.0 | 17.0 |
| Elongation @ break, % | 447 | 464 | 450 |
| $M_{300}$, MPa | 10.2 | 11.6 | 11.1 |
| Rebound, RT | 52.4 | 53.3 | 49.7 |
| Rebound, hot | 67.4 | 66.5 | 65.7 |
| Hardness, RT | 56.9 | 61.7 | 59.8 |
| Hardness, hot | 55.0 | 58.4 | 57.2 |
| DIN abrasion | 151 | 148 | 150 |

EXAMPLE IV

Rubber compounds containing emulsion polymerization prepared styrene/butadiene rubber (E-SBR), cis 1,4-polybutadiene rubber and, optionally, epoxidized natural rubber were prepared, similarly to Example I with carbon black reinforcement, optionally together with calcium carbonate and identified in Table 7 as Exp Q, R and S with Ctrl P being represented as a Control.

TABLE 7

|  | Ctrl P | Exp Q | Exp R | Exp S |
|---|---|---|---|---|
| 1st Non-Productive |  |  |  |  |
| E-SBR[1] | 50 | 50 | 40 | 40 |
| Polybutadiene[2] | 50 | 50 | 50 | 50 |
| ENR 25[3] | 0 | 0 | 10 | 10 |
| Carbon black | 50 | 35 | 35 | 35 |
| Calcium carbonate[4] | 0 | 15 | 15 | 15 |
| Processing oil | 5 | 5 | 5 | 5 |
| Zinc oxide | 5 | 5 | 5 | 5 |
| Fatty acid | 2 | 2 | 2 | 2 |
| Antioxidant | 2 | 2 | 2 | 2 |
| Si69 Coupler (50%) | 0 | 0 | 0 | 3 |
| 2nd Non-Productive |  |  |  |  |

1st Non-Productive mixed again without additional materials added.

TABLE 7-continued

|  | Ctrl P | Exp Q | Exp R | Exp S |
|---|---|---|---|---|
| Productive |  |  |  |  |
| Sulfenamide Accelerator | 1.2 | 1.5 | 1.5 | 1.5 |
| Diphenylguanidine | 1.0 | 1.0 | 1.0 | 1.0 |
| Sulfur | 1.0 | 1.2 | 1.2 | 1.0 |

[1]Emulsion polymerized butadiene/styrene rubber obtained as SOLFLEX® 1502 from The Goodyear Tire & Rubber Company.
[2]Cis 1,4-polybutadiene obtained as BUDENE® 1207 from The Goodyear Tire & Rubber Company.
[3]Epoxidized natural rubber obtained as ENR 25 (25 percent epoxidized level) from the Malaysian rubber company.
[4]Surface-treated natural ground calcium carbonate, obtained as Omya, from Omya BSH.

The rubber compositions were cured under conditions of elevated pressure and temperature (about 150° C.) for about 36 minutes. Physical properties for the rubber compositions are shown in the following Table 8.

TABLE 8

|  | Ctrl P | Exp Q | Exp R | Exp S |
|---|---|---|---|---|
| ENR | 0 | 0 | 10 | 10 |
| Carbon black | 50 | 35 | 35 | 35 |
| $CaCO_3$ | 0 | 15 | 15 | 15 |
| Si69 (50%) | 0 | 0 | 0 | 3 |
| Max. torque | 42.2 | 40.4 | 41 | 42.4 |
| Min. torque | 8 | 6 | 6 | 6.3 |
| $T_{90}$, min. | 17.5 | 18.5 | 14 | 17.5 |
| $T_{25}$, min. | 12.3 | 13.8 | 10.3 | 10.8 |
| Tensile strength, MPa | 18.1 | 12.12 | 12.51 | 13.72 |
| Elongation @ break, % | 488 | 446 | 464 | 470 |
| $M_{100}$, MPa | 2.24 | 1.89 | 1.98 | 2.07 |
| $M_{300}$, MPa | 10.23 | 7.34 | 7.26 | 7.97 |
| Rebound, RT | 46.7 | 57.1 | 52.5 | 54.6 |
| Rebound, hot | 58.1 | 66.1 | 63.8 | 65.4 |
| Hardness, RT | 65.3 | 59.8 | 61.3 | 60.7 |
| Hardness, hot | 59.3 | 55.2 | 56.5 | 57.5 |
| DIN abrasion | 64 | 105 | 103 | 88 |

The DIN abrasion value (lower is better) for Exp. S, as compared to Ctrl P indicating that the combination of epoxidized natural rubber and Si69 coupler, together with the calcium carbonate, is predictive of better (improved) treadwear for the rubber composition when used as a tire tread.

While certain representative embodiments and details have been shown for the purpose of illustrating the invention, it will be apparent to those skilled in this art that various changes and modifications may be made therein without departing from the spirit or scope of the invention.

What is claimed is:

1. A rubber tire having a tread of a composition which comprises (A) 100 parts by weight of elastomer consisting essentially of a combination of at least one diene-based elastomer and an epoxidized diene-based elastomer, (B) about 15 to about 45 phr of particulate reinforcement comprised of carbon black and precipitated silica, said silica having silanol groups on the surface thereof, (C) about 5 to about 50 phr of calcium carbonate particles having an average diameter in a range of from 50 to 14,000 nanometers (0.0005 to 0.014 mm) and (D) at least one modifier comprised of at least one of dithiodipropionic acid, nicotinamide and bis-3(trialkoxysilylalkyl) polysulfide having an average of from 2.1 to about 4 sulfur atoms in its polysulfide bridge and where such alkyl groups contain from two to four carbon atoms.

* * * * *